(12) United States Patent
Oomura et al.

(10) Patent No.: US 6,956,704 B2
(45) Date of Patent: Oct. 18, 2005

(54) HIGH MAGNIFICATION, FOUR-GROUP ZOOM LENS

(75) Inventors: Makoto Oomura, Ina Machi (JP); Nobuaki Toyama, Saitama (JP)

(73) Assignee: Fujinon Corporation, Saitama (JP)

( * ) Notice: Subject to any disclaimer, the term of this patent is extended or adjusted under 35 U.S.C. 154(b) by 34 days.

(21) Appl. No.: 10/778,188

(22) Filed: Feb. 17, 2004

(65) Prior Publication Data

US 2004/0169935 A1 Sep. 2, 2004

(30) Foreign Application Priority Data

Feb. 28, 2003 (JP) ........................................ 2003-053497

(51) Int. Cl.$^7$ .............................................. G02B 27/64
(52) U.S. Cl. ........................................................ 359/687
(58) Field of Search ................................. 359/686, 687

(56) References Cited

U.S. PATENT DOCUMENTS 4,504,124 A * 3/1985 Imai et al. .................. 359/687
5,579,171 A * 11/1996 Suzuki et al. ............... 359/687
6,128,140 A * 10/2000 Yoneyama .................. 359/687

FOREIGN PATENT DOCUMENTS

JP        2001-183584       7/2001

* cited by examiner

Primary Examiner—Georgia Epps
Assistant Examiner—M. Hasan
(74) Attorney, Agent, or Firm—Arnold International; Jon W. Henry; Bruce Y. Arnold

(57) ABSTRACT

A high magnification, four-group zoom lens formed of only four lens groups, namely, a first lens group of positive refractive power, a second lens group of negative refractive power, and third and fourth lens groups of positive refractive power. The first lens group includes, in order from the object side, a first lens subgroup that is fixed during focusing and a second lens subgroup that moves during focusing. The second lens group includes, in order from the object side, first and second lens elements having negative refractive power, and first and second doublet components with each formed of a lens element having positive refractive power and a lens element having negative refractive power. To suppress lateral color, specified conditions are satisfied for the Abbe numbers and the refractive indices of the positive refractive power lens elements that are included in the doublet components of the second lens group.

20 Claims, 6 Drawing Sheets

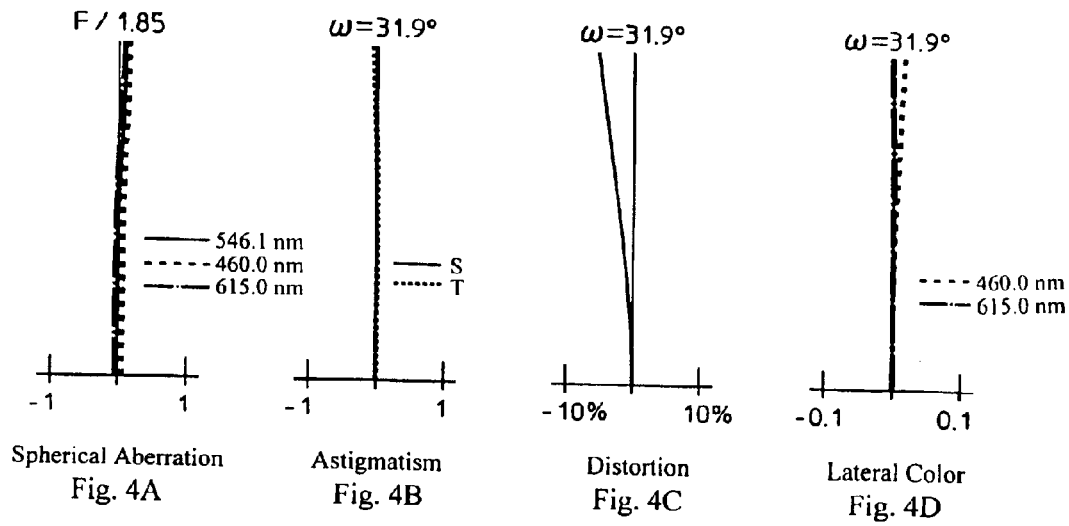
Spherical Aberration
Fig. 4A
Astigmatism
Fig. 4B
Distortion
Fig. 4C
Lateral Color
Fig. 4D
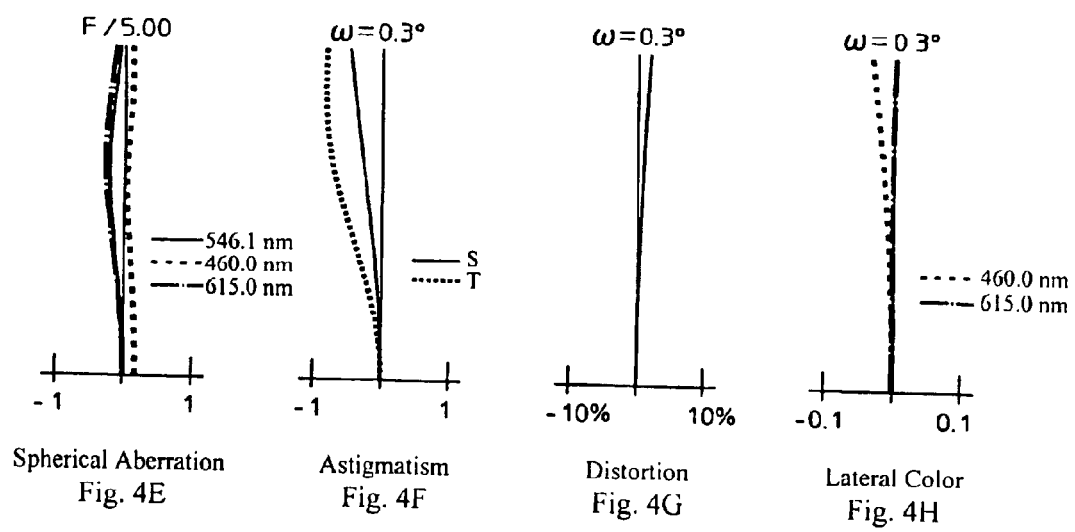
Spherical Aberration
Fig. 4E
Astigmatism
Fig. 4F
Distortion
Fig. 4G
Lateral Color
Fig. 4H

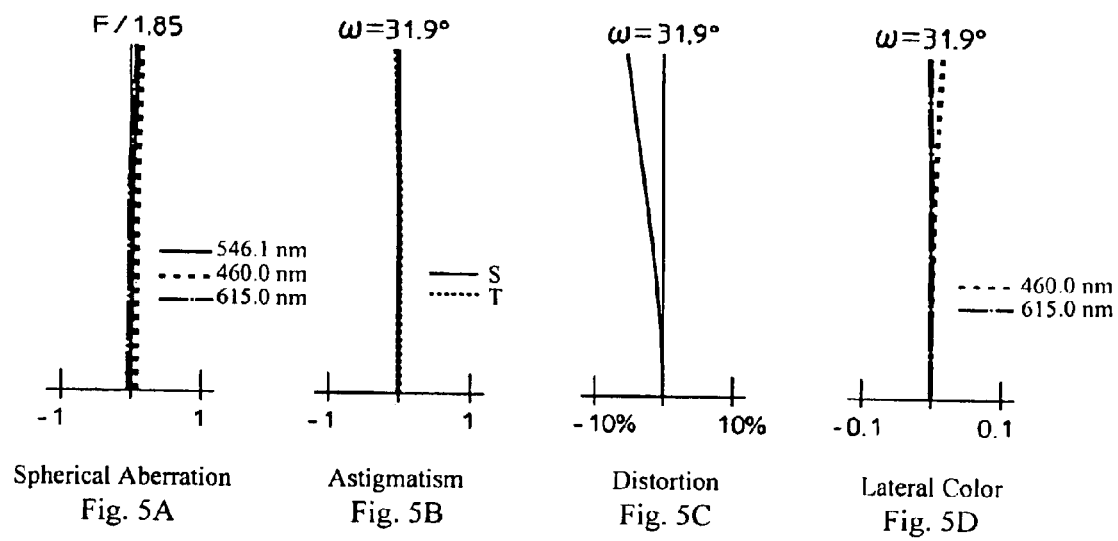
Spherical Aberration
Fig. 5A
Astigmatism
Fig. 5B
Distortion
Fig. 5C
Lateral Color
Fig. 5D
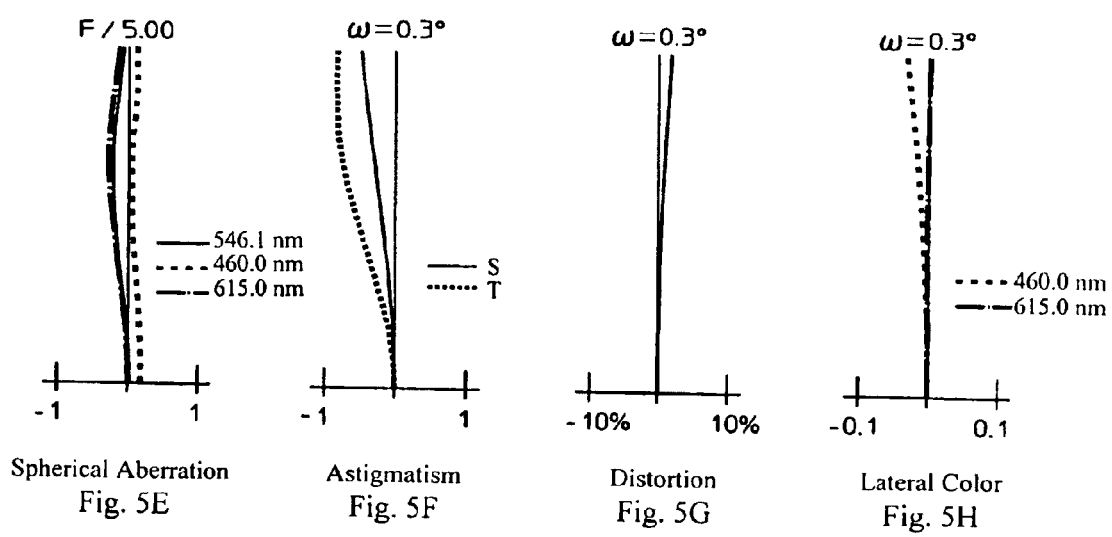
Spherical Aberration
Fig. 5E
Astigmatism
Fig. 5F
Distortion
Fig. 5G
Lateral Color
Fig. 5H

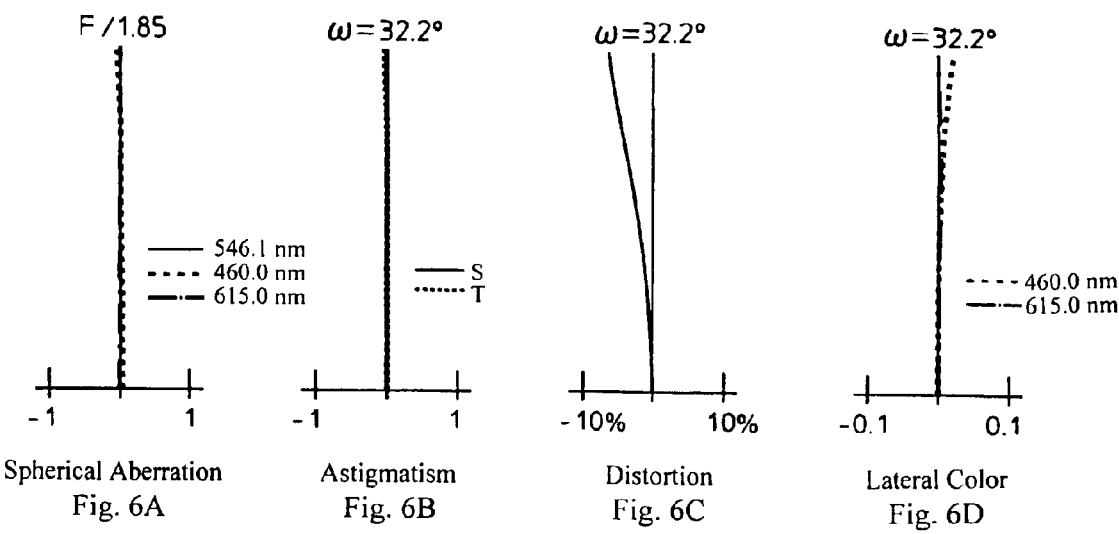
Fig. 6A Spherical Aberration
Fig. 6B Astigmatism
Fig. 6C Distortion
Fig. 6D Lateral Color
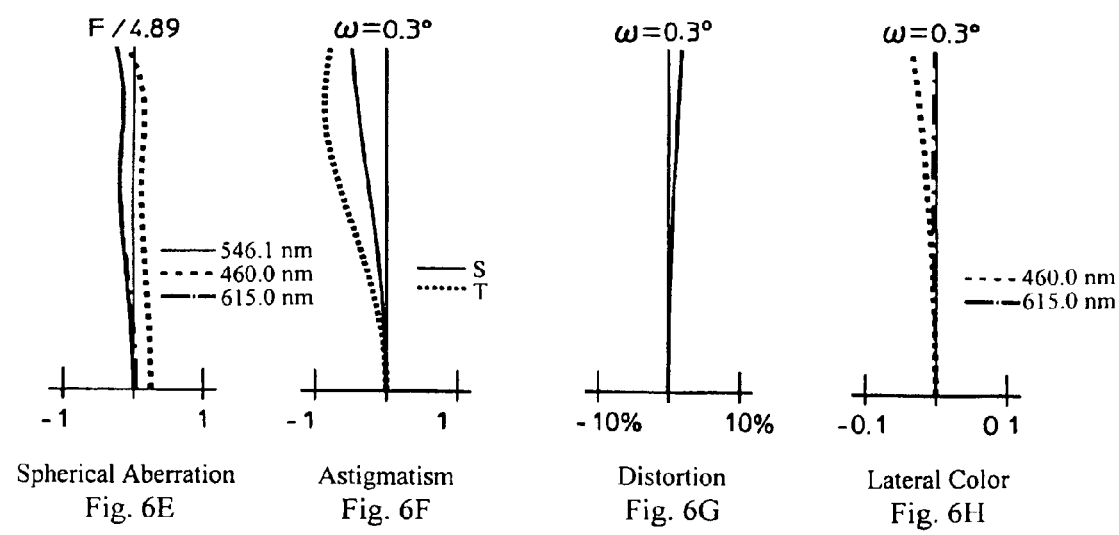
Fig. 6E Spherical Aberration
Fig. 6F Astigmatism
Fig. 6G Distortion
Fig. 6H Lateral Color

HIGH MAGNIFICATION, FOUR-GROUP ZOOM LENS

BACKGROUND OF THE INVENTION

Zoom lenses used in television cameras for broadcasting are expected to realize high performance over the entire zooming range, the entire focusing range, and over the entire image plane, as well as to satisfy certain conditions associated with the use of a solid state image pickup device, such as a CCD. In addition, there is an increasing demand for zoom lenses with higher magnifications and larger zoom ratios.

One of the prior art zoom lenses that fulfills the above requirements is disclosed in Japanese Laid-Open Patent Application 2001-183584. The zoom lens of this Japanese patent application consists of four lens groups, namely, a focusing lens group, a variator lens group, a compensator lens group, and a relay lens group in order from the object side, and achieves a zoom ratio of 66.

It is difficult to achieve high optical performance over the entire range of zoom and range of focus with a zoom ratio of 80 or larger and with large aperture ratios, for example with the f-numbers being between 1.8 and 3.3. In particular, the refractive indices of the lens elements of the lens groups, the lens element configurations of the lens groups, as well as the chromatic properties for achromatization, must be properly and strictly prescribed in order to achieve high optical performance without increasing the size or weight of the lens system too much, that is, without excessively increasing the spacings between the lens groups or the number of lens elements.

Aberrations at the telephoto end of the range of zoom and fluctuations in aberrations associated with focusing need to be minimized in current applications for high definition broadcasting systems such as high definition television systems. More particularly, it is difficult to achieve high resolution without reducing the absolute value of the lateral color and without reducing fluctuations in the lateral color throughout the entire range of zoom and the range of focus.

BRIEF SUMMARY OF THE INVENTION

The present invention relates to a zoom lens having a high magnification, a large zoom ratio, and high performance with favorable correction of lateral color over the entire range of zoom and range of focus. More specifically, the present invention is a high magnification, four-group zoom lens that is particularly suitable for use in television, video, and photographic cameras.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 4A–4D show the spherical aberration, astigmatism, distortion, and lateral color, respectively, of the zoom lens according to Embodiment 1 at the wide-angle end;

FIGS. 4E–4H show the spherical aberration, astigmatism, distortion, and lateral color, respectively, of the zoom lens according to Embodiment 1 at the telephoto end;

FIGS. 5A–5D show the spherical aberration, astigmatism, distortion, and lateral color, respectively, of the zoom lens according to Embodiment 2 at the wide-angle end;

FIGS. 5E–5H show the spherical aberration, astigmatism, distortion, and lateral color, respectively, of the zoom lens according to Embodiment 2 at the telephoto end;

FIGS. 6A–6D show the spherical aberration, astigmatism, distortion, and lateral color, respectively, of the zoom lens according to Embodiment 3 at the wide-angle end; and FIGS. 6E–6H show the spherical aberration, astigmatism, distortion, and lateral color, respectively, of the zoom lens according to Embodiment 3 at the telephoto end.

DETAILED DESCRIPTION

Figure 1:
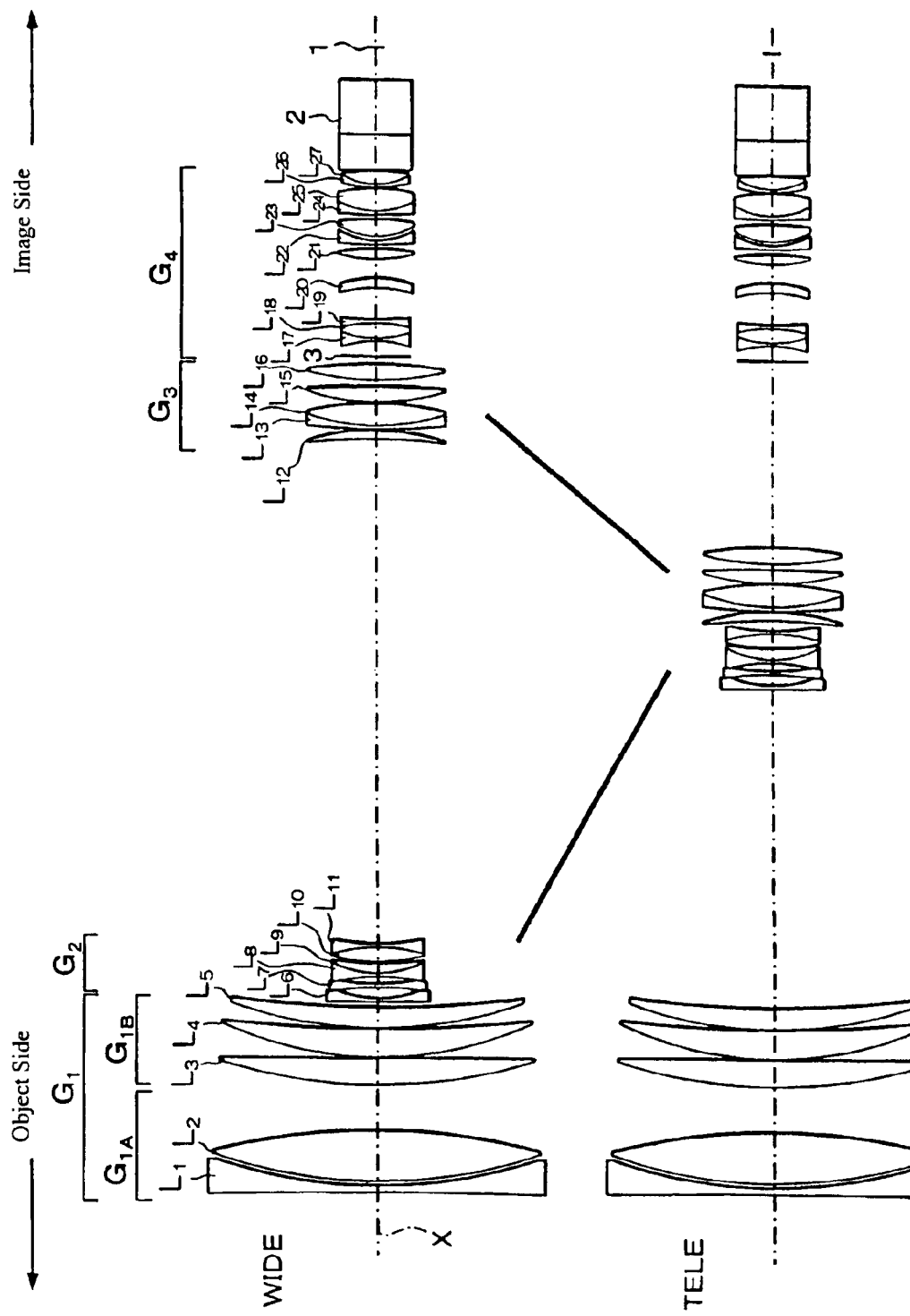
FIG. 1 shows cross-sectional views of Embodiment 1 of the present invention at the wide-angle end (WIDE) and at the telephoto end (TELE)
Figure 2:
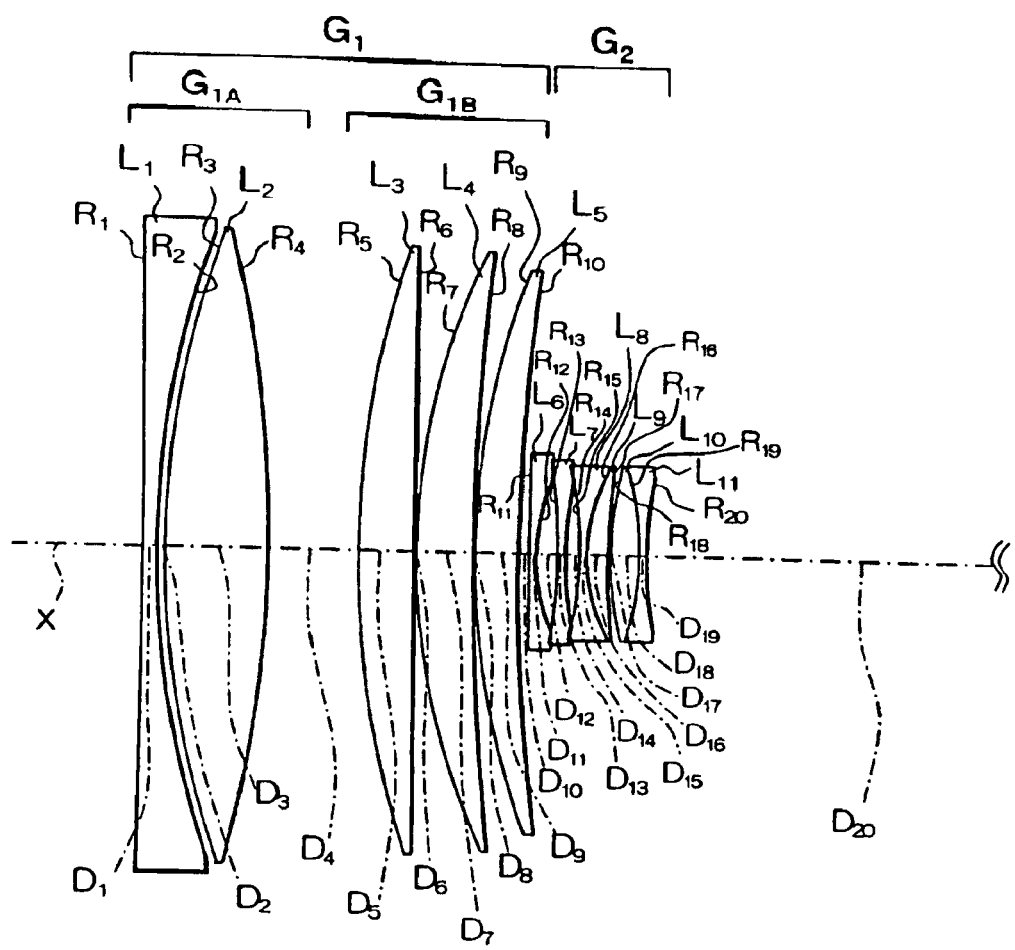
FIG. 2 shows a detailed cross-sectional view of Embodiment 1 of the zoom lens of the present invention at the wide-angle end.
Figure 2:
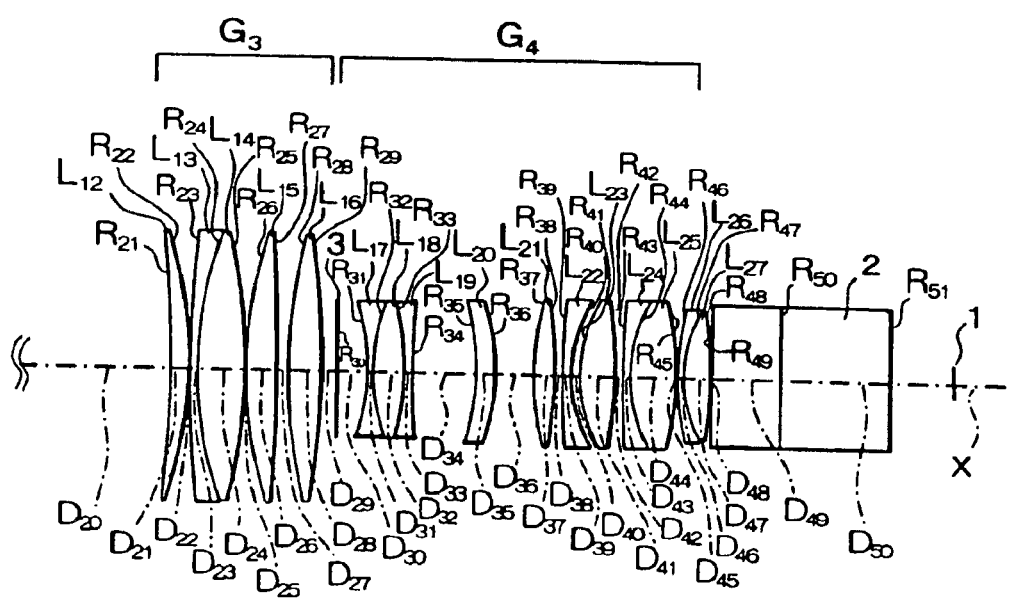

A general description of the preferred embodiments of the zoom lens of the present invention will now be described with reference to FIGS. 1 and 2 that show Embodiment 1. FIG. 1 shows cross-sectional views of Embodiment 1 of the present invention at the wide-angle end (WIDE) and at the telephoto end (TELE). The straight lines in FIG. 1 indicate the movement of lens groups $G_2$ and $G_3$ when zooming between the two illustrated zoom settings. Lens groups $G_1$ and $G_4$ remain stationary during zooming. FIG. 2 shows a detailed cross-sectional view of Embodiment 1 of the zoom lens of the present invention at the wide-angle end. In FIG. 1 and FIG. 2, lens groups are referenced by the letter G with a subscript denoting their order from the object side of the zoom lens, from $G_1$ to $G_4$, and with lens group $G_1$ being further divided, in order from the object side, into a first lens subgroup $G_{1A}$ and a second lens subgroup $G_{1B}$. Similarly, in FIG. 1 and FIG. 2, lens elements are referenced by the letter L with a subscript denoting their order from the object side, from $L_1$ to $L_{27}$. Similarly, in FIG. 2, the radii of curvature of the optical surfaces of all the optical elements, including the surfaces of a color separating optical system 2, such as a prism system, are referenced by the letter R with a subscript denoting their order from the object side of the zoom lens, from $R_1$ to $R_{51}$. The on-axis surface spacings along the optical axis X of all the optical element surfaces are referenced by the letter D with a subscript denoting their order from the object side of the zoom lens, from $D_1$ to $D_{50}$.

The definitions of the terms "lens element," lens component," "lens group," and "lens subgroup" that relate to the descriptions above and the following detailed description are as follows. The term "lens element" is herein defined as a single transparent mass of refractive material having two opposed refracting surfaces that are positioned at least generally transverse to the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified. At intermediate stages of evaluation, a lens group may be divided into smaller organizations of lens components that may be identified as "lens subgroups" of a particular lens group.

As shown in FIGS. 1 and 2, the high magnification, four-group zoom lens of the present invention includes, in order from the object side, a first lens group $G_1$ of positive refractive power that is fixed during zooming, a second lens group $G_2$ of negative refractive power that is moved during zooming so as to vary the focal length of the zoom lens, a third lens group $G_3$ of positive refractive power that is moved during zooming in order to suppress what would otherwise be a shift in the image plane along the optical during zooming, and a fourth lens group $G_4$ of positive refractive power that is fixed during zooming. The high magnification, four-group zoom lens is constructed so that the second lens group $G_2$ and the third lens group $G_3$ approach each other when zooming from the wide-angle end to the telephoto end. The light flux that enters from the object side along the optical axis X is imaged at image plane 1 onto a solid-state image detecting device (not shown), such as a CCD, that is used to capture the image.

In the following descriptions, references will be frequently made to a "lens element." However, as set forth above, it is understood that numerous of the lens elements described below are also lens components and may be replaced by lens components that include more than one lens element.

The second lens group $G_2$ includes, in order from the object side, a sixth lens element $L_6$ of negative refractive power, a seventh lens element $L_7$ of negative refractive power, a lens component formed of an eighth lens element $L_8$ having negative refractive power that is intimately bonded to a ninth lens element $L_9$ of positive refractive power so as to form a doublet, and a lens component formed of a tenth lens element $L_{10}$ of positive refractive power that is intimately bonded to an eleventh lens element $L_{11}$ of negative refractive power so as to form a doublet. The term "intimately bonded" is defined herein generally to mean that adjacent refractive surfaces of two lens elements have substantially the same curvature and are held in direct fixed contact or are separated by a thin layer of transparent adhesive (too thin to be considered in optical computations) that fixes the lens elements together, the latter being commonly referred to as a "cemented" lens element arrangement.

Based on the definitions of "lens component" and "intimately bonded" above, it is clear that the doublets described above are lens components. However, to emphasize the nature of those doublets being lens components, the doublets will be described hereinafter as doublet components.

The high magnification, four-group zoom lens of the invention satisfies the following condition:

$$|\nu_{P1}-\nu_{P2}|<5 \qquad \text{Condition (1)}$$

where $\nu_{P1}$ is the Abbe number at the d-line (587.6 nm) of the lens element having positive refractive power of one of the doublet components having both a lens element having positive refractive power and a lens element having negative refractive power of the second lens group and that is on the image side of at least two other lens elements of the second lens group that do not form part of the doublet components; and $\nu_{P2}$ is the Abbe number at the d-line (587.6 nm) of the lens element having positive refractive power of another of the doublet components having both a lens element having positive refractive power and a lens element having negative refractive power of the second lens group and that is on the image side of at least two other lens elements of the second lens group that do not form part of the doublet components.

In the zoom lens of FIGS. 1 and 2, $\nu_{P1}$ is the Abbe number at the d-line of the lens material of the ninth lens element $L_9$ or the tenth lens element $L_{10}$, and $\nu_{P2}$ is the Abbe number at the d-line of the lens material of the other of the ninth lens element $L_9$ or the tenth lens element $L_{10}$.

Condition (1) limits the difference in Abbe numbers of the materials used to form lens elements of positive refractive power for two doublet components of the second lens group $G_2$. By satisfying Condition (1), the lateral color of the zoom lens can be favorably corrected. In addition, it is more preferable that the difference in Abbe numbers of the materials used to form the positive lens elements for the two doublet components be less than 3, and more desirably less than 2 so that lateral color can be more effectively corrected.

Preferably, the four-group zoom lens of the present invention satisfies the following Conditions (2)–(5):

$$\nu_{P1}<28 \qquad \text{Condition (2)}$$
$$\nu_{P2}<28 \qquad \text{Condition (3)}$$
$$N_{P1}>1.75 \qquad \text{Condition (4)}$$
$$N_{P2}>1.75 \qquad \text{Condition (5)}$$

where $\nu_{P1}$ and $\nu_{P2}$ are as defined above;

$N_{P1}$ is the refractive index at the e-line (546.1 nm) of the lens element having positive refractive power of one of the doublet components having both a lens element having positive refractive power and a lens element having negative refractive power of the second lens group and that is on the image side of at least two other lens elements of the second lens group that do not form part of the doublet components; and $N_{P2}$ is the refractive index at the e-line (546.1 nm) of the lens element having positive refractive power of another of the doublet components having both a lens element having positive refractive power and a lens element having negative refractive power of the second lens group and that is on the image side of at least two other lens elements of the second lens group that do not form part of the doublet components.

In general, it may be difficult to correct chromatic aberrations, particularly the lateral color that occurs with zooming and focusing a zoom lens having a high magnification and zoom ratio. Achromatization by combining lens elements with positive and negative refractive powers and different dispersive powers is known for correcting such aberration. When the variator has negative refractive power, the positive and negative lens elements that form the variator have larger and smaller dispersive powers, respectively. A doublet component with such a construction is used to correct lateral color. With lens materials, usually glasses, that satisfy Conditions (2)–(5) being used, the doublet components effectively serve as achromatic lens components so as to satisfactorily correct the lateral color. Optical performance is even more improved if the refractive indices of the optical materials that form the positive lens elements referenced in Conditions (4) and (5) are larger than 1.8.

In a variator for achromatizing zoom lenses in a manner similar to that described above, the use of a triplet consisting of negative, positive, and negative lens elements is known. However, it is preferable to use two positive lens elements in order to divide positive power between them and to define the properties of two positive lenses in an extremely high zoom ratio zoom lens as described herein where high optical performance is required. For example, a known material for the positive lens element in an achromatic lens component using lens elements with positive and negative refractive powers and different dispersive powers has an Abbe number of 22.8. Using a lens element of this material as the positive lens element in a triplet leads to excessive correction. Satisfactory correction is obtained at the wide-angle and telephoto ends while significant aberrations occur at intermediate focal lengths. When two positive lens elements are used for achromatization, as in the present invention, one lens element having positive refractive power may be made of a material having an Abbe number of 22.8 and the other lens element having positive refractive power may be made of a material having a slightly larger Abbe number, for example, approximately five percent larger. This enables aberrations to be satisfactorily corrected over the entire range of zoom.

The high magnification, four-group zoom lens of the present invention can be modified in a variety of ways. For example, the two lenses that form each of the two doublet components of the second lens group can be arranged in either order from the object side, that is, with either the positive lens element or the negative lens element of each doublet component on the object side.

Embodiments 1–3 of the present invention will now be individually described with further reference to the drawings.

Embodiment 1

In Embodiment 1, as shown in FIGS. 1 and 2, the first lens group $G_1$ includes, in order from the object side: a first lens element $L_1$ that is biconcave having surfaces of different curvature and with its surface of greater curvature on the image side; a second lens element $L_2$ that is biconvex having surfaces of different curvature and with its surface of greater curvature on the object side; a third lens element $L_3$ of positive refractive power and a meniscus shape with its convex surface on the object side; a fourth lens element $L_4$; and a fifth lens element $L_5$. In the first lens group $G_1$, the first lens element $L_1$ and the second lens element $L_2$ form a first lens subgroup $G_{1A}$ that is fixed during focusing. The third lens element $L_3$, the fourth lens element $L_4$, and the fifth lens element $L_5$ form a second lens subgroup $G_{1B}$ that is moved as a unit during focusing.

The second lens group $G_2$ includes, in order from the object side: a sixth lens element $L_6$ of negative refractive power and a meniscus shape with its convex surface on the object side; a seventh lens element $L_7$ that is biconcave having surfaces of different curvature and with its surface of greater curvature on the image side; a doublet component (a first doublet component) formed of an eighth lens element $L_8$ that is biconcave having surfaces of different curvature and with its surface of greater curvature on the image side intimately bonded to a ninth lens element $L_9$ of positive refractive power and a meniscus shape with its convex surface on the object side; and, a doublet component (a second doublet component) formed of a tenth lens element $L_{10}$ that is biconvex having surfaces of different curvature and with its surface of greater curvature on the image side intimately bonded to an eleventh lens element $L_{11}$ that is biconcave having surfaces of different curvature and with its surface of greater curvature on the object side.

The third lens group $G_3$ includes, in order from the object side: a twelfth lens element $L_{12}$ of positive refractive power and a meniscus shape with its convex lens surface on the image side; a doublet component formed of a thirteenth lens element $L_{13}$ having negative refractive power and a meniscus shape with its concave lens surface on the image side intimately bonded to a fourteenth lens element $L_{14}$ that is biconvex having surfaces of different curvature and with its surface of greater curvature on the object side; a fifteenth lens element $L_{15}$ that is biconvex having surfaces of different curvature with its surface of greater curvature on the object side; and a sixteenth lens element $L_{16}$.

The fourth lens group $G_4$ includes, in order from the object side: a triplet formed of a seventeenth lens element $L_{17}$ that is biconcave having surfaces of different curvature and with its surface of greater curvature on the image side intimately bonded to an eighteenth lens element $L_{18}$ that is biconvex having surfaces of different curvature and with its surface of lesser curvature on the image side intimately bonded to a nineteenth lens element $L_{19}$ that is biconcave having surfaces of different curvature and with its surface of greater curvature on the object side; a twentieth lens element $L_{20}$ of positive refractive power and a meniscus shape with its convex surface on the image side; a twenty-first lens element $L_{21}$ that is biconvex having surfaces of different curvature and with its surface of greater curvature on the object side; a twenty-second lens element $L_{22}$ of negative refractive power and a meniscus shape with its convex lens surface on the object side; a twenty-third lens element $L_{23}$ that is biconvex having lens surfaces of different curvature and with its lens surface of greater curvature on the object side; a doublet component formed of a twenty-fourth lens element $L_{24}$ of negative refractive power and a meniscus shape with its concave surface on the image side intimately bonded to a twenty-fifth lens element $L_{25}$ that is biconvex having surfaces of different curvature and with its surface of greater curvature on the object side; and, a doublet component formed of a twenty-sixth lens element $L_{26}$ of negative refractive power and a meniscus shape with its concave lens surface on the image side intimately bonded to a twenty-seventh lens element $L_{27}$ that is biconvex having surfaces of different curvature and with its lens surface of greater curvature on the object side.

As shown in FIGS. 1 and 2, a diaphragm 3 is positioned between the third lens group $G_3$ and the fourth lens group $G_4$, and a three-color separating optical system 2, such as a prism, is positioned on the image side of the fourth lens group $G_4$.

Table 1 below lists the surface number #, in order from the object side, the radius of curvature R (in mm) of each surface, the on-axis surface spacing D (in mm), as well as the refractive index $N_e$ (at the e-line of 546.1 nm) and the Abbe number $v_d$ (at the d-line of 587.6 nm) of each lens element for Embodiment 1.

TABLE 1

| # | R | D | $N_e$ | $v_d$ |
|---|---|---|---|---|
| 1 | −4912.124 | 4.400 | 1.80399 | 42.3 |
| 2 | 299.435 | 1.626 | | |
| 3 | 297.782 | 32.290 | 1.43497 | 95.1 |
| 4 | −399.929 | 27.500 | | |
| 5 | 306.113 | 17.553 | 1.43497 | 95.1 |
| 6 | 22096.994 | 0.250 | | |
| 7 | 220.084 | 18.123 | 1.43497 | 95.1 |
| 8 | 800.361 | 0.250 | | |
| 9 | 251.006 | 13.900 | 1.43986 | 95.0 |
| 10 | 672.412 | $D_{10}$ (variable) | | |
| 11 | 2284.957 | 2.100 | 1.88813 | 40.9 |
| 12 | 64.827 | 6.885 | | |
| 13 | −181.423 | 2.050 | 1.82016 | 46.7 |
| 14 | 138.032 | 4.603 | | |
| 15 | −116.419 | 2.020 | 1.72056 | 47.9 |
| 16 | 58.867 | 6.960 | 1.85500 | 23.9 |
| 17 | 214.852 | 0.200 | | |
| 18 | 114.248 | 9.359 | 1.81643 | 22.8 |
| 19 | −93.849 | 2.000 | 1.80399 | 47.5 |
| 20 | 122.890 | $D_{20}$ (variable) | | |
| 21 | −366.827 | 5.686 | 1.57098 | 71.3 |
| 22 | −135.290 | 0.200 | | |
| 23 | 398.667 | 2.300 | 1.85500 | 23.9 |
| 24 | 119.920 | 14.565 | 1.49846 | 81.5 |
| 25 | −174.190 | 0.200 | | |
| 26 | 139.073 | 9.424 | 1.43986 | 95.0 |
| 27 | −656.674 | 3.500 | | |
| 28 | 172.076 | 10.234 | 1.43986 | 95.0 |
| 29 | −260.402 | $D_{29}$ (variable) | | |
| 30 | ∞ (stop) | 9.500 | | |
| 31 | −66.487 | 1.700 | 1.75844 | 52.3 |
| 32 | 58.115 | 9.800 | 1.81265 | 25.4 |
| 33 | −78.213 | 1.700 | 1.80644 | 46.7 |
| 34 | 245.168 | 20.360 | | |
| 35 | −76.600 | 6.140 | 1.51825 | 64.1 |
| 36 | −64.918 | 11.700 | | |
| 37 | 84.826 | 6.550 | 1.48915 | 70.2 |
| 38 | −144.892 | 2.500 | | |
| 39 | 279.146 | 2.500 | 1.89334 | 39.2 |
| 40 | 43.884 | 2.300 | | |
| 41 | 43.996 | 11.110 | 1.51825 | 64.1 |
| 42 | −150.700 | 2.500 | | |
| 43 | 309.838 | 2.500 | 1.83931 | 37.2 |
| 44 | 46.404 | 14.400 | 1.48915 | 70.2 |
| 45 | −88.251 | 0.200 | | |
| 46 | 80.495 | 2.000 | 1.83946 | 42.7 |
| 47 | 39.005 | 8.600 | 1.52032 | 59.0 |
| 48 | −129.022 | 0.000 | | |
| 49 | ∞ | 21.540 | 1.51825 | 64.1 |
| 50 | ∞ | 33.000 | 1.58565 | 46.5 |
| 51 | ∞ | | | |

Embodiment 1 of the present invention satisfies Conditions (1)–(5) above, as is apparent from comparing these conditions with the data set forth in Table 1 above.

In the high magnification, four-group zoom lens of Embodiment 1, the second lens group $G_2$ and the third lens group $G_3$ move during zooming. Therefore, the values of the on-axis spacings $D_{10}$, $D_{20}$, and $D_{29}$ between the lens groups change with zooming. Table 2 below lists the values of the variables $D_{10}$, $D_{20}$, and $D_{29}$ (i.e, the group spacings) at the wide-angle end (f=9.35 mm at the e-line of 546.1 nm) and at the telephoto end (f=902.28 at the e-line of 546.1 nm) for Embodiment 1.

TABLE 2

| f | $D_{10}$ | $D_{20}$ | $D_{29}$ |
|---|---|---|---|
| 9.35 | 2.821 | 313.968 | 4.660 |
| 902.28 | 198.528 | 6.617 | 116.304 |

The ratio of the focal length at the telephoto end divided by the focal length at the wide-angle end define a zoom ratio of 96.5 for Embodiment 1.

FIGS. 4A–4D show the spherical aberration, astigmatism, distortion, and lateral color, respectively, of the zoom lens of Embodiment 1 at the wide-angle end, having an f-number of 1.85. FIGS. 4E–4H show the spherical aberration, astigmatism, distortion, and lateral color, respectively, of the zoom lens of Embodiment 1 at the telephoto end having an f-number of 5.00. In FIGS. 4A and 4E, the spherical aberration is shown for the wavelengths 546.1 nm, 460.0 nm, and 615.0 nm. The spherical aberration, astigmatism, and lateral color are in units of mm, and ω is the half-field angle. In FIGS. 4B and 4F, the astigmatism is shown for the sagittal image surface S and the tangential image surface T. In FIGS. 4D and 4H, the lateral color is shown for the wavelengths 460.0 nm and 615.0 nm relative to the d-line. As is apparent from these figures, the various aberrations are favorably corrected over the entire range of zoom.

Embodiment 2

Embodiment 2 is very similar to Embodiment 1 and therefore only the differences between Embodiment 2 and Embodiment 1 will be explained. In Embodiment 2, the sixth lens element $L_6$, which is in the second lens group $G_2$, is a biconcave lens element with its lens surface of greater curvature on the image side.

Table 3 below lists the surface number #, in order from the object side, the radius of curvature R (in mm) of each surface, the on-axis surface spacing D (in mm), as well as the refractive index $N_e$ (at the e-line of 546.1 nm) and the Abbe number $v_d$ (at the d-line of 587.6 nm) of each lens element for Embodiment 2.

TABLE 3

| # | R | D | $N_e$ | $v_d$ |
|---|---|---|---|---|
| 1 | −485.470 | 4.400 | 1.80399 | 42.3 |
| 2 | 515.493 | 1.626 | | |
| 3 | 530.014 | 28.674 | 1.43497 | 95.1 |
| 4 | −305.627 | 27.500 | | |
| 5 | 564.960 | 17.767 | 1.43497 | 95.1 |
| 6 | −640.799 | 0.250 | | |
| 7 | 279.932 | 18.776 | 1.43497 | 95.1 |
| 8 | 77741.212 | 0.250 | | |
| 9 | 189.012 | 13.900 | 1.43986 | 95.0 |
| 10 | 448.311 | $D_{10}$ (variable) | | |
| 11 | −4629.909 | 2.100 | 1.88813 | 40.9 |
| 12 | 67.454 | 6.842 | | |
| 13 | −165.471 | 2.050 | 1.82016 | 46.7 |
| 14 | 141.626 | 4.653 | | |
| 15 | −111.893 | 2.020 | 1.72056 | 47.9 |
| 16 | 56.193 | 6.960 | 1.85500 | 23.9 |
| 17 | 278.966 | 0.200 | | |
| 18 | 103.338 | 10.195 | 1.81643 | 22.8 |
| 19 | −85.248 | 2.000 | 1.82016 | 46.7 |
| 20 | 109.470 | $D_{20}$ (variable) | | |
| 21 | −331.740 | 5.556 | 1.57098 | 71.3 |
| 22 | −132.790 | 0.200 | | |
| 23 | 422.303 | 2.300 | 1.85500 | 23.9 |
| 24 | 122.801 | 14.767 | 1.49846 | 81.5 |
| 25 | −162.494 | 0.200 | | |
| 26 | 143.633 | 9.369 | 1.43986 | 95.0 |
| 27 | −585.433 | 3.500 | | |
| 28 | 178.213 | 10.070 | 1.43986 | 95.0 |
| 29 | −258.326 | $D_{29}$ (variable) | | |
| 30 | ∞ (stop) | 9.500 | | |
| 31 | −66.424 | 1.700 | 1.75844 | 52.3 |
| 32 | 58.128 | 9.800 | 1.81265 | 25.4 |
| 33 | −78.182 | 1.700 | 1.80644 | 46.7 |
| 34 | 245.212 | 20.360 | | |

TABLE 3-continued

| # | R | D | $N_e$ | $v_d$ |
|---|---|---|---|---|
| 35 | −76.570 | 6.140 | 1.51825 | 64.1 |
| 36 | −64.499 | 11.700 | | |
| 37 | 84.860 | 6.550 | 1.48915 | 70.2 |
| 38 | −144.750 | 2.500 | | |
| 39 | 279.305 | 2.500 | 1.88814 | 40.8 |
| 40 | 43.884 | 2.300 | | |
| 41 | 44.015 | 11.110 | 1.51825 | 64.1 |
| 42 | −150.581 | 2.500 | | |
| 43 | 310.120 | 2.500 | 1.83931 | 37.2 |
| 44 | 46.414 | 14.400 | 1.48915 | 70.2 |
| 45 | −88.219 | 0.200 | | |
| 46 | 80.512 | 2.000 | 1.83946 | 42.7 |
| 47 | 39.013 | 8.600 | 1.52032 | 59.0 |
| 48 | −135.119 | 0.000 | | |
| 49 | ∞ | 21.540 | 1.51825 | 64.1 |
| 50 | ∞ | 33.000 | 1.58565 | 46.5 |
| 51 | ∞ | | | |

Embodiment 2 of the present invention satisfies Conditions (1)–(5) above, as is apparent from comparing these conditions with the data set forth in Table 3 above.

In the high magnification, four-group zoom lens of Embodiment 2, the second lens group $G_2$ and the third lens group $G_3$ move during zooming. Therefore, the values of the on-axis spacings $D_{10}$, $D_{20}$, and $D_{29}$ between the lens groups change with zooming. Table 4 below lists the values of the variables $D_{10}$, $D_{20}$, and $D_{29}$ (i.e, the group spacings) at the wide-angle end (f=9.35 mm) and at the telephoto end (f=902.28) at the e-line (546.1 nm) for Embodiment 2.

TABLE 4

| f | $D_{10}$ | $D_{20}$ | $D_{29}$ |
|---|---|---|---|
| 9.35 | 18.722 | 313.655 | 4.660 |
| 902.28 | 214.430 | 6.303 | 116.304 |

The ratio of the focal length at the telephoto end divided by the focal length at the wide-angle end define a zoom ratio of 96.5 for Embodiment 2.

FIGS. 5A–5D show the spherical aberration, astigmatism, distortion, and lateral color, respectively, of the zoom lens of Embodiment 2 at the wide-angle end, having an f-number of 1.85. FIGS. 5E–5H show the spherical aberration, astigmatism, distortion, and lateral color, respectively, of the zoom lens of Embodiment 2 at the telephoto end having an f-number of 5.00. In FIGS. 5A and 5E, the spherical aberration is shown for the wavelengths 546.1 nm, 460.0 nm, and 615.0 nm. The spherical aberration, astigmatism, and lateral color are in units of mm, and ω is the half-field angle. In FIGS. 5B and 5F, the astigmatism is shown for the sagittal image surface S and the tangential image surface T. In FIGS. 5D and 5H, the lateral color is shown for the wavelengths 460.0 nm and 615.0 nm relative to the d-line. As is apparent from these figures, the various aberrations are favorably corrected over the entire range of zoom.

Embodiment 3

Figure 3:
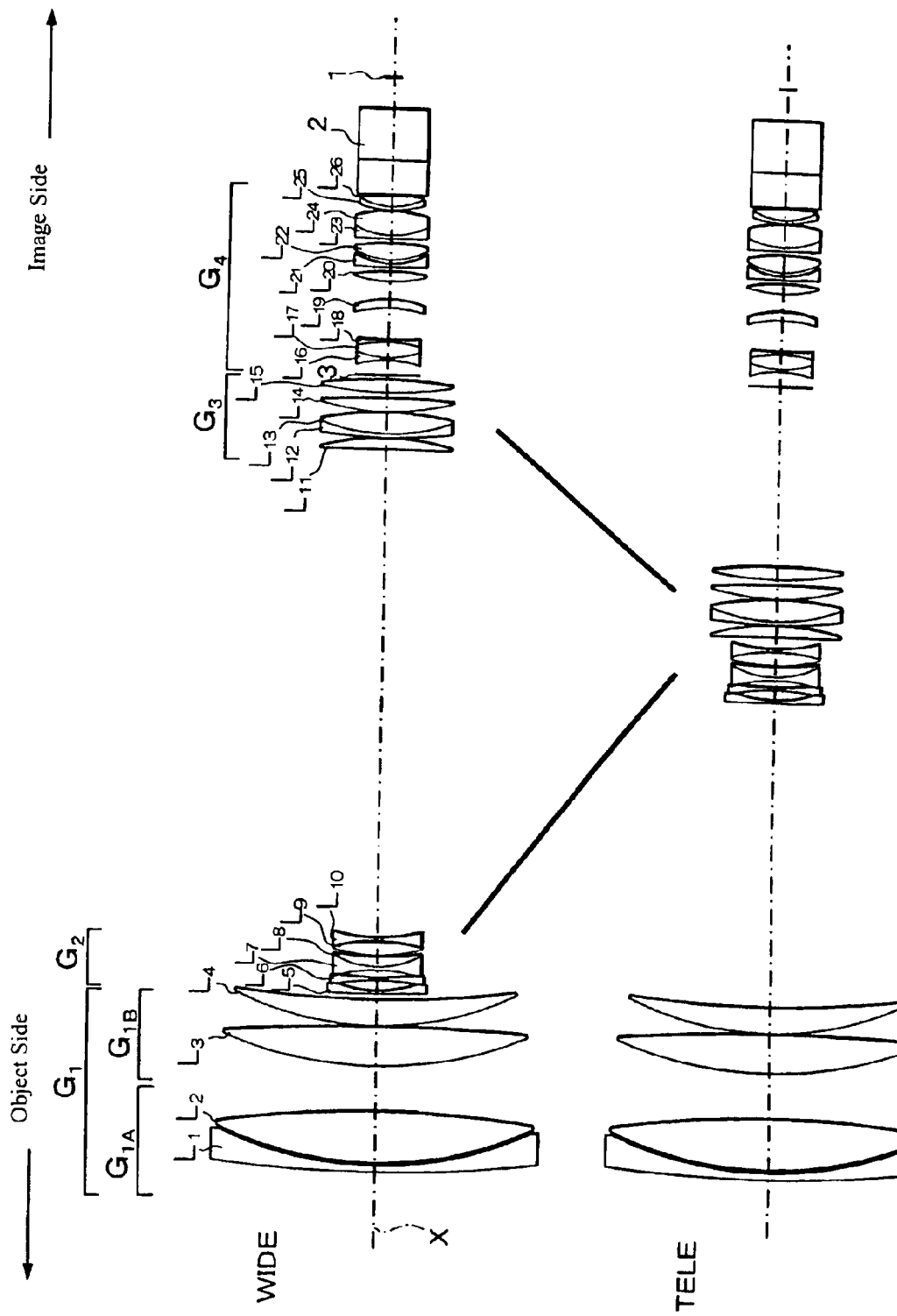
FIG. 3 shows cross-sectional views of Embodiment 3 of the present invention at the wide-angle end (WIDE) and at the telephoto end (TELE)

Embodiment 3 is very similar to Embodiment 1 and therefore only the differences between Embodiment 3 and Embodiment 1 will be explained. FIG. 3 shows Embodiment 3. As shown in FIG. 3, the first lens group $G_1$ of the zoom lens of Embodiment 3 includes only four lens elements, in order from the object side, a first lens element $L_1$ having negative refractive power and a meniscus shape with its convex lens surface on the object side, second and third lens element $L_2$ and $L_3$ that are biconvex lens elements, each with its lens surface of greater curvature on the object side, and a fourth lens element $L_4$ having positive refractive power and a meniscus shape with its convex lens surface on the object side. In the first lens group $G_1$, the first lens element $L_1$ and the second lens element $L_2$ form a first lens subgroup $G_{1A}$, which is fixed during focusing, and the third lens element $L_3$ and the fourth lens element $L_4$ form a second lens subgroup $G_{1B}$, which is moved during focusing.

The second lens group $G_2$ includes lens elements $L_5$ to $L_{10}$ that have nearly the same configuration as lens elements $L_6$ to $L_{11}$ of Embodiment 1. However, Embodiment 3 differs from Embodiment 1 in that the sixth lens element $L_6$ is a biconcave lens elements with its lens surface of greater curvature on the object side, and the second doublet component is formed of a ninth lens element $L_9$ that is a biconvex lens element with its lens surface of lesser curvature on the image side intimately bonded to a tenth lens element $L_{10}$ that is a biconcave lens element with its lens surface of greater curvature on the image side. In Embodiment 3, the lens element having positive refractive power of the first doublet component is the eighth lens element $L_8$, and the lens element having positive refractive power of the second doublet component is the ninth lens element $L_9$.

Table 5 below lists the surface number #, in order from the object side, the radius of curvature R (in mm) of each surface, the on-axis surface spacing D (in mm), as well as the refractive index $N_e$ (at the e-line of 546.1 nm) and the Abbe number $v_d$ (at the d-line of 587.6 nm) of each lens element for Embodiment 3.

TABLE 5

| # | R | D | $N_e$ | $v_d$ |
|---|---|---|---|---|
| 1 | 833.435 | 4.400 | 1.81070 | 40.7 |
| 2 | 233.343 | 1.596 | | |
| 3 | 233.343 | 32.503 | 1.43497 | 95.1 |
| 4 | −652.981 | 29.000 | | |
| 5 | 238.578 | 25.663 | 1.43497 | 95.1 |
| 6 | −1326.507 | 0.250 | | |
| 7 | 192.958 | 17.100 | 1.43986 | 95.0 |
| 8 | 602.473 | $D_8$ (variable) | | |
| 9 | 1054.327 | 2.100 | 1.88813 | 40.9 |
| 10 | 72.155 | 6.656 | | |
| 11 | −153.285 | 2.050 | 1.82016 | 46.7 |
| 12 | 203.158 | 4.732 | | |
| 13 | −88.674 | 2.020 | 1.72056 | 47.9 |
| 14 | 53.209 | 7.400 | 1.85500 | 23.9 |
| 15 | 216.712 | 0.200 | | |
| 16 | 98.406 | 9.235 | 1.81643 | 22.8 |
| 17 | −111.663 | 2.050 | 1.81070 | 40.7 |
| 18 | 94.760 | $D_{18}$ (variable) | | |
| 19 | −8293.655 | 7.215 | 1.57098 | 71.3 |
| 20 | −153.959 | 0.200 | | |
| 21 | 310.334 | 2.300 | 1.85500 | 23.9 |
| 22 | 112.681 | 14.237 | 1.49846 | 81.5 |
| 23 | −207.247 | 0.200 | | |
| 24 | 145.001 | 9.246 | 1.43986 | 95.0 |
| 25 | −607.512 | 3.500 | | |
| 26 | 202.953 | 8.593 | 1.43986 | 95.0 |
| 27 | −333.282 | $D_{27}$ (variable) | | |
| 28 | ∞ (stop) | 9.500 | | |
| 29 | −65.747 | 1.700 | 1.77621 | 49.6 |
| 30 | 54.053 | 9.800 | 1.81265 | 25.4 |
| 31 | −83.859 | 1.700 | 1.80644 | 46.7 |
| 32 | 255.934 | 20.360 | | |
| 33 | −79.770 | 6.140 | 1.51825 | 64.1 |
| 34 | −62.365 | 11.700 | | |
| 35 | 82.131 | 6.550 | 1.48915 | 70.2 |
| 36 | −127.860 | 2.500 | | |
| 37 | 557.303 | 2.500 | 1.88814 | 40.8 |

TABLE 5-continued

| # | R | D | $N_e$ | $v_d$ |
|---|---|---|---|---|
| 38 | 44.291 | 2.300 | | |
| 39 | 45.222 | 11.110 | 1.51825 | 64.1 |
| 40 | −123.350 | 2.500 | | |
| 41 | 504.271 | 2.500 | 1.83931 | 37.2 |
| 42 | 49.907 | 15.400 | 1.48915 | 70.2 |
| 43 | −88.068 | 0.200 | | |
| 44 | 69.848 | 2.000 | 1.83946 | 42.7 |
| 45 | 42.159 | 7.600 | 1.52032 | 59.0 |
| 46 | −199.639 | 0.000 | | |
| 47 | ∞ | 21.540 | 1.51825 | 64.1 |
| 48 | ∞ | 33.000 | 1.58565 | 46.5 |
| 49 | ∞ | | | |

Embodiment 3 of the present invention satisfies Conditions (1)–(5) above, as is apparent from comparing these conditions with the data set forth in Table 5 above.

In the high magnification, four-group zoom lens of Embodiment 3, the second lens group $G_2$ and the third lens group $G_3$ move during zooming. Therefore, the values of the on-axis spacings $D_8$, $D_{18}$, and $D_{27}$ between the lens groups change with zooming. Table 6 below lists the values of the variables $D_8$, $D_{18}$, and $D_{27}$ (i.e, the group spacings) at the wide-angle end (f=9.35 mm) and at the telephoto end (f=897.60) at the e-line (546.1 =n) for Embodiment 3.

TABLE 6

| f | $D_8$ | $D_{18}$ | $D_{27}$ |
|---|---|---|---|
| 9.35 | 3.861 | 312.319 | 3.017 |
| 897.60 | 195.538 | 7.753 | 115.906 |

The ratio of the focal length at the telephoto end divided by the focal length at the wide-angle end define a zoom ratio of 96.0 for Embodiment 3.

FIGS. 6A–6D show the spherical aberration, astigmatism, distortion, and lateral color, respectively, of the zoom lens of Embodiment 3 at the wide-angle end, having an f-number of 1.85. FIGS. 6E–6H show the spherical aberration, astigmatism, distortion, and lateral color, respectively, of the zoom lens of Embodiment 3 at the telephoto end having an f-number of 4.89. In FIGS. 6A and 6E, the spherical aberration is shown for the wavelengths 546.1 nm, 460.0 nm, and 615.0 nm. The spherical aberration, astigmatism, and lateral color are in units of mm, and ω is the half-field angle. In FIGS. 6B and 6F, the astigmatism is shown for the sagittal image surface S and the tangential image surface T. In FIGS. 6D and 6H, the lateral color is shown for the wavelengths 460.0 nm and 615.0 nm relative to the d-line. As is apparent from these figures, the various aberrations are favorably corrected over the entire range of zoom.

The present invention is not limited to the aforementioned embodiments, as it will be obvious that various alternative implementations are possible. For instance, values such as the radius of curvature R of each of the lens components, the surface spacings D, the refractive index $N_e$, as well as the Abbe number $v_d$, are not limited to the examples indicated in each of the aforementioned embodiments, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens formed of only four lens groups, in order from the object side along an optical axis, as follows:

a first lens group having positive refractive power;

a second lens group having negative refractive power;

a third lens group having positive refractive power; and a fourth lens group having positive refractive power;

wherein the first lens group and the fourth lens group do not move during zooming;

the second lens group and the third lens group are moved along the optical axis during zooming;

the second lens group includes, in order from the object side along the optical axis, a first lens component having negative refractive power, a second lens component having negative refractive power, a first doublet component formed of a lens element having positive refractive power and a lens element having negative refractive power, and a second doublet component formed of a lens element having positive refractive power and a lens element having negative refractive power; and the following condition is satisfied $|v_{P1} - v_{P2}| < 5$ where $v_{P1}$ is the Abbe number at the d-line of the lens element having positive refractive power of said first doublet component, and $v_{P2}$ is the Abbe number at the d-line of the lens element having positive refractive power of said second doublet component.

2. The zoom lens of claim 1, wherein the following conditions are satisfied:

$v_{P1} < 28$ $v_{P2} < 28$ $N_{P1} > 1.75$ $N_{P2} > 1.75$ where $N_{P1}$ is the refractive index at the e-line of the lens element having positive refractive power of said first doublet component, and $N_{P2}$ is the refractive index at the e-line of the lens element having positive refractive power of said second doublet component.

3. The zoom lens of claim 1, wherein the second lens group consists of said first lens component, said second lens component, said first doublet component, and said second doublet component.

4. The zoom lens of claim 2, wherein the second lens group consists of said first lens component, said second lens component, said first doublet component, and said second doublet component.

5. The zoom lens of claim 1, wherein each of said first lens component and said second lens component consists of a lens element.

6. The zoom lens of claim 2, wherein each of said first lens component and said second lens component consists of a lens element.

7. The zoom lens of claim 3, wherein each of said first lens component and said second lens component consists of a lens element.

8. The zoom lens of claim 4, wherein each of said first lens component and said second lens component consists of a lens element.

9. The zoom lens of claim 1, wherein the zoom lens has a zoom ratio of greater than 70.

10. The zoom lens of claim 2, wherein the zoom lens has a zoom ratio of greater than 70.

11. The zoom lens of claim 3, wherein the zoom lens has a zoom ratio of greater than 70.

12. The zoom lens of claim 4, wherein the zoom lens has a zoom ratio of greater than 70.

13. The zoom lens of claim 9, wherein the focal length of the zoom lens at the telephoto end is greater than 800 mm.

14. The zoom lens of claim 10, wherein the focal length of the zoom lens at the telephoto end is greater than 800 mm.

15. The zoom lens of claim 11, wherein the focal length of the zoom lens at the telephoto end is greater than 800 mm.

16. The zoom lens of claim 12, wherein the focal length of the zoom lens at the telephoto end is greater than 800 mm.

17. The zoom lens of claim 1, wherein the focal length of the zoom lens at the telephoto end is greater than 800 mm.

18. The zoom lens of claim 2, wherein the focal length of the zoom lens at the telephoto end is greater than 800 mm.

19. The zoom lens of claim 3, wherein the focal length of the zoom lens at the telephoto end is greater than 800 mm.

20. The zoom lens of claim 4, wherein the focal length of the zoom lens at the telephoto end is greater than 800 mm.

* * * * *